United States Patent Office 3,055,866
Patented Sept. 25, 1962

3,055,866
HYDROLYSIS OF ACETAL COPOLYMERS
Yasuji Oyanagi, Kurashiki City, Japan, assignor to Kurashiki Rayon Co., Ltd., Okayama, Japan, a corporation of Japan
No Drawing. Filed Aug. 21, 1959, Ser. No. 835,190
3 Claims. (Cl. 260—73)

This invention relates to the preparation of vinyl acetate copolymers containing aldehyde groups.

Previously, attempts have been made to prepare vinyl acetate copolymers which contain aldehyde groups by copolymerizing monomeric vinyl acetate with an unsaturated aldehyde such as acrolein. However, such prior polymerizations have been generally unsatisfactory due to the high reactivity of the aldehyde group.

It is an object of the present invention to provide an improved process whereby vinyl acetate copolymers containing aldehyde groups can be prepared.

Other objects will be apparent from the following description of the invention.

In accordance with the present invention, monomeric vinyl acetate is copolymerized with an acrolein acetal to form a vinyl acetate-acrolein acetal copolymer. Unlike acrolein itself, the acrolein acetal is readily copolymerized with vinyl acetate to form stable high molecular weight copolymers. Subsequently, the vinyl acetate-acrolein acetal copolymer is subjected to acid catalyzed hydrolysis or alcoholysis under controlled conditions such that the copolymer ester groups remain substantially unchanged while the acetal groups are converted to aldehyde groups. The process of the invention is illustrated by the following equations:

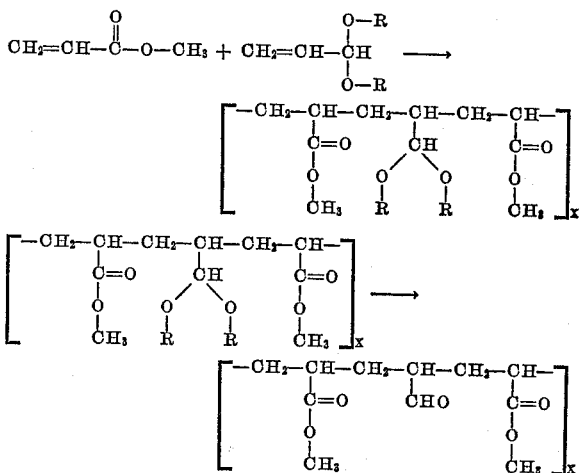

wherein R is an alkyl radical having about 1–4 carbon atoms.

The copolymers prepared in accordance with this invention have wide utility. The said copolymers can be used to form additional polymeric materials through graft polymerization with vinyl pyridine, vinyl pyrrolidone, acrylonitrile, methyl methacrylate, acrylic acid esters, styrene, and the like. The copolymers also are useful for cross-linking hydroxyl-containing materials such as polyvinyl alcohol, and for many other uses.

In carrying out this invention, vinyl acetate is copolymerized with about 10 mol percent or less, e.g. about 1–10 mol percent, of an acrolein acetal. The polymerization can be carried out in the presence of catalysts which are normally used for the polymerization of vinyl acetate. Illustrative catalysts include 2,2′-azobisisobutyronitrile, benzoyl peroxide, acetyl peroxide, and the like. Bulk or solution polymerization in solvents such as methanol are satisfactorily employed.

Generally, the greater the concentration of acrolein acetal in the monomer mixture to be polymerized the lower is the degree of polymerization of the resulting copolymer. This relation is shown in Table 1 for a particular set of polymerization conditions.

TABLE 1

*Composition of Feed*

| Percent by mol of acrolein dimethylacetal: | Polymerization degree of the produced copolymer |
|---|---|
| 2.0 | 2120 |
| 3.4 | 1735 |
| 5.1 | 1132 |
| 6.8 | 917 |
| 8.6 | 643 |
| 10.0 | 526 |

After polymerization, the copolymer is subjected to acidic hydrolysis in order to convert the acetal groups to aldehyde groups. The term hydrolysis as used herein is intended to include both hydrolysis and alcoholysis of the acetal groups to aldehyde groups. The hydrolysis is carried out under conditions whereby the acetal groups are selectively converted to aldehyde groups while there is no substantial hydrolysis of the ester groups to hydroxyl groups.

The hydrolysis is carried out using acid catalyst. Suitable catalysts include hydrochloric acid, sulfuric acid and nitric acid. The hydrolysis is carried out in an aqueous lower alcohol reaction medium. Methanol and ethanol are preferred alcohols for use. Water is employed in amount such that the vinyl acetate-acrolein acetal copolymer dissolves in the alcohol-water mixture. The copolymers dissolve in methanol containing up to about 40% water and in ethanol containing up to about 45% water. In preferred practice of the invention, methanol or ethanol containing 20–30% water is employed for the selective hydrolysis of the acetal groups. Dilute acid catalyst concentrations are employed. Mild reaction temperatures, e.g. 0–40° C. and preferably about 20–30° C., are employed. The reaction time can vary depending upon other conditions such as catalyst concentration, reaction temperature and the like. Generally hydrolysis reaction times of ½ to 5 hours are suitable.

Hydrolysis in a methanol-water solution using hydrochloric acid catalyst is especially preferred. In this system the methanol preferably contains 20–30% water. The hydrochloric acid in concentration of 0.02 to 0.04 N in the reaction mixture is used. Room temperature to about 30° C. is the preferred temperature range for the reaction, and reaction times of 1–2 hours are suitable.

Under the above hydrolysis conditions, the acetal groups contained in the polymer are selectively converted to aldehyde groups while the ester groups are not substantially hydrolyzed. The resulting vinyl acetate-acrolein copolymer can be precipitated from the hydrolysis mixture by the addition of potassium carbonate solution or by other means, and recovered.

The following examples illustrate the invention:

*Example I*

Vinyl acetate in amount of 23.5 grams was admixed with 1.5 grams of acrolein dimethyl acetal and 0.0125 grams of 2,2′-azobisisobutyronitrile. The mixture was copolymerized under a nitrogen atmosphere for 8 hours at 60° C. Polymerization conversion was 13%. The copolymer had solubility characteristics similar to those of polyvinyl acetate.

The copolymer was purified by precipitation, redissolving and reprecipitation. About 2 grams of the purified copolymer were disolved in 98 grams of a methanol-water solution containing 25% water. With stirring, 3 cc. of 2 N hydrochloric acid were added to the copolymer solution, and the resulting solution was maintained at 30° C. for 1 hour and 30 minutes in order to convert the acetal groups to aldehyde groups.

The copolymer was precipitated in aqueous potassium carbonate solution, washed and recovered. The copolymer had a degree of polymerization of about 1132 and contained 2.6 mol percent of aldehyde groups.

*Example II*

Vinyl acetate in amount of 22.5 grams was copolymerized with 2.5 grams of acrolein dimethyl acetal in the presence of 0.0125 gram of 2,2′-azobisisobutyronitrile for 15 hours at 60° C. under nitrogen atmosphere. Polymerization conversion was 19%.

About 2 grams of the copolymer thus obtained was dissolved in a methanol-water solution comprising 24% water. With stirring, about 4 cc. of 1 N hydrochloric acid were added to the copolymer solution, and the resulting solution was maintained at 30° C. for 2 hours and 10 minutes in order to convert the acetal groups to aldehyde groups.

The copolymer was precipitated in aqueous potassium carbonate solution, washed and recovered. The copolymer had a degree of polymerization of about 643 and contained 6.6 mol percent of aldehyde groups.

I claim:

1. The method of preparing a vinyl acetate copolymer containing aldehyde groups which comprises hydrolyzing a vinyl acetate-acrolein acetal copolymer containing about 1 to about 10 mol percent acrolein acetal for about ½ to about 5 hours at a temperature up to about 40° C. in an aqueous $C_1$–$C_2$ alkanol solution containing from about 20 percent to about 40% water in the presence of a dilute acid catalyst selected from the group consisting of hydrochloric acid, sulfuric acid and nitric acid to produce a vinyl acetate copolymer containing aldehyde groups, and recovering said product vinyl acetate copolymer containing aldehyde groups.

2. The method of preparing a vinyl acetate copolymer containing aldehyde groups which comprises hydrolyzing a vinyl acetate-acrolein acetal copolymer containing about 1 to 10 mol percent acrolein acetal for about ½ to about 5 hours in an aqueous $C_1$–$C_2$ alkanol solution containing about 20–30% water at a temperature of 0 to 40° C. in the presence of a dilute acid catalyst selected from the group consisting of hydrochloric acid, sulfuric acid and nitric acid to produce a vinyl acetate copolymer containing aldehyde groups, and recovering product vinyl acetate copolymer containing aldehyde groups.

3. The method of preparing a vinyl acetate copolymer containing aldehyde groups which comprises hydrolyzing a vinyl acetate-acrolein dimethyl acetal copolymer containing about 1–10 mol percent of said acetal in a methanol solution containing 20–30% water and hydrochloric acid in concentration of 0.02–0.04 N at 20–30° C. for about 1–2 hours, and recovering product vinyl acetate copolymer containing aldehyde groups.

References Cited in the file of this patent
UNITED STATES PATENTS
2,467,430    Izard _____ Apr. 19, 1949